US008234313B2

(12) United States Patent  
Bonatti et al.

(10) Patent No.: US 8,234,313 B2
(45) Date of Patent: Jul. 31, 2012

(54) SHARED BUSINESS INTELLIGENCE ELEMENTS

(75) Inventors: Alain Bonatti, Le Perreux sur Marne (FR); Stéphane Lecercle, Herblay (FR); Françoise Corvaisier, Antony (FR)

(73) Assignee: Business Objects Software Limited, Dublin (IE)

( * ) Notice: Subject to any disclaimer, the term of this patent is extended or adjusted under 35 U.S.C. 154(b) by 373 days.

(21) Appl. No.: 12/538,993

(22) Filed: Aug. 11, 2009

(65) Prior Publication Data

US 2011/0040802 A1    Feb. 17, 2011

(51) Int. Cl.
 G06F 17/30    (2006.01)
 G06F 7/00    (2006.01)
(52) U.S. Cl. ..................................................... 707/803
(58) Field of Classification Search ................... 707/803
 See application file for complete search history.

(56) References Cited

U.S. PATENT DOCUMENTS 7,861,253 B1 * 12/2010 Lettington et al. ............ 719/328
2008/0005689 A1 * 1/2008 Evernden et al. ............. 715/765

OTHER PUBLICATIONS

"Oracle Business Intelligence Publisher User's Guide", Release 10.1.3.2, Part No. 40017-01, ORACLE®, 2005, 2006.*

* cited by examiner

Primary Examiner — Kuen Lu
(74) Attorney, Agent, or Firm — Buckley, Maschoff & Talwalkar LLC

(57) ABSTRACT

Some aspects relate to reception of a selection of a business intelligence report element in a first business intelligence report of a first file format, creation of a serialized description of the business intelligence report element in a second file format based on a business intelligence report element data model, reception of an instruction to add the business intelligence report element to a second business intelligence report of a third file format, and addition of the business intelligence report element to the second business intelligence report in the third file format based on the serialized description of the business intelligence report element.

21 Claims, 10 Drawing Sheets

ABSTRACT

SHARED BUSINESS INTELLIGENCE ELEMENTS

BACKGROUND

Enterprise software systems receive, generate and store data related to many aspects of a business enterprise. Reporting systems are commonly used to present such enterprise data to users in a coherent manner.

Reporting systems typically allow a report designer to create a report specification, which includes a layout of one or more report elements (e.g., sections, tables, graphs, header, footer, etc.) and associated queries for retrieving data which is to populate the report elements. When a report is requested, these systems provide a populated report based on stored enterprise data and the report specification. If the relevant stored enterprise data changes, a subsequently-generated report will include the changed data.

Conventional reporting systems do not allow report elements or their associated queries to be efficiently shared between different reports. SAP BusinessObjects' Web Intelligence (WebI) allows a report element to be shared among different reports of a same document, but the shared report element must be used in the exact same manner (i.e., with the same style, structure and underlying queries) within the different reports of the document.

Systems are desired to leverage an already-created report element and/or query (hereinafter referred to as Business Intelligence (BI) elements) to create a corresponding BI element within a subsequent report. The subsequent report may be created in a reporting system (WebI, Crystal Reports, Excel, etc.) which is different from the BI reporting system in which the original BI element was created. Moreover, systems are desired in which the corresponding BI element can differ from the original BI element in at least one of style, structure or semantic.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
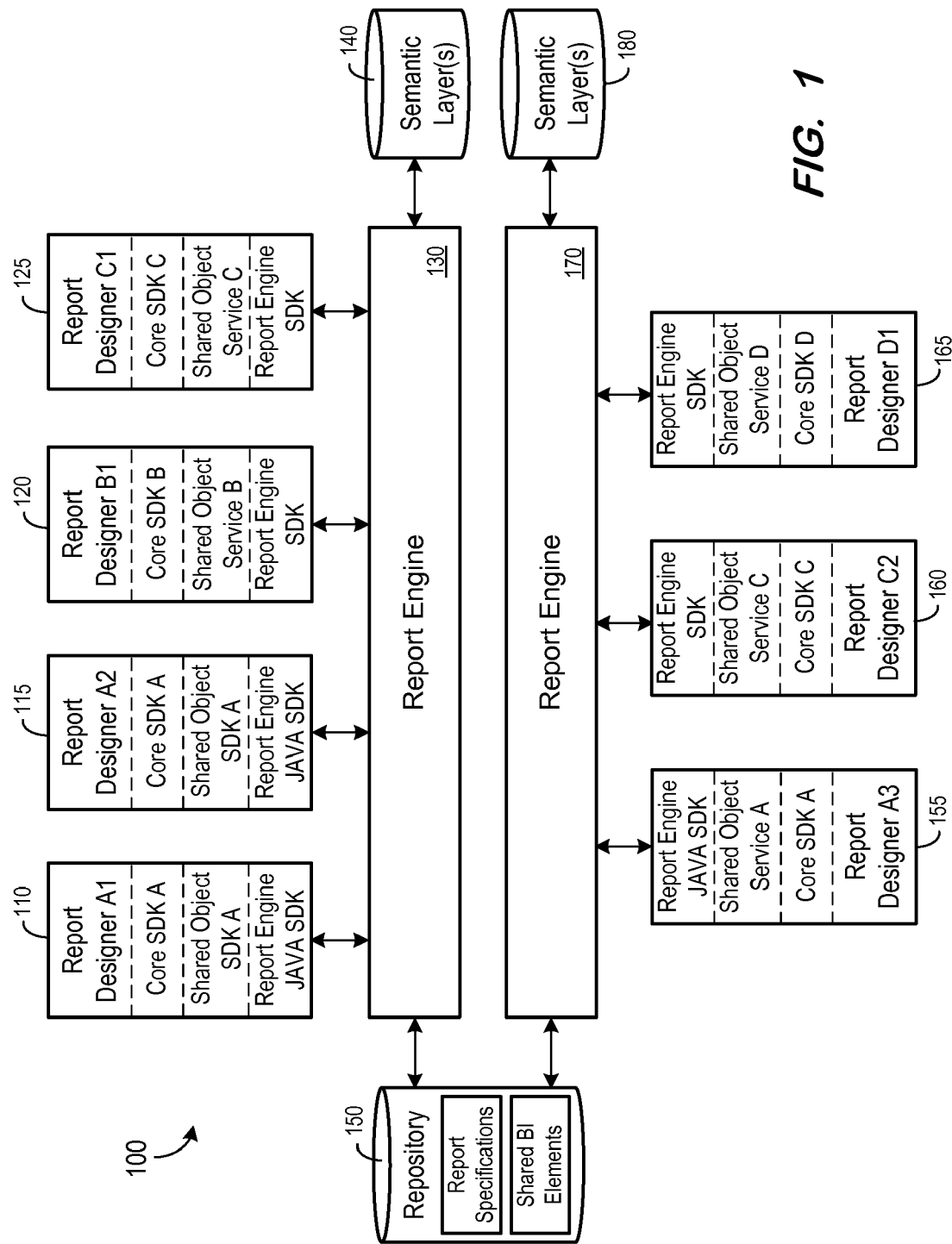
FIG. 1 is a block diagram of a system according to some embodiments.

FIG. 1 is a block diagram illustrating system 100 according to some embodiments. Each element of system 100 may comprise any suitable combination of hardware and/or software, and each element may be located remote from one or more other elements. System 100 may operate to provide shareable BI elements among disparate reporting systems. Embodiments are not limited to system 100.

System 100 includes report designer A1 (110), report designer A2 (115), report designer B1 (120) and report designer C1 (125). Each of report designers 110 through 125 is in communication with report engine 130. Report designers 110 through 125 may operate to create business intelligence reports in corresponding file formats.

For example, core SDK A of report designer A1 (110) comprises a software package for creating business intelligence reports in a file format A. Any suitable file format may be employed, including but not limited to the .wid and .xls file formats. Report designer A1 (110) includes program code to provide a user interface for receiving user commands for creating a report and for invoking appropriate functions of core SDK A in response thereto.

Shared object SDK A may be used to render a BI element shareable, and/or to use a shareable BI element according to some embodiments. Examples of the foregoing processes will be provided below. Briefly, shared object SDK A of report designer A1 (110) may receive a selection of a business intelligence report element in a business intelligence report of file format A (e.g., from core SDK A of report designer A1 (110)), and create a serialized description of the selected business intelligence report element in a second file format (e.g., eXtensible Markup Language (XML)) based on a business intelligence report element data model. Also, or alternatively, shared object SDK A of report designer A1 (110) may receive an instruction to add a business intelligence report element to a business intelligence report of file format A, and add the selected business intelligence report element to the business intelligence report in file format A based on the serialized description of the selected business intelligence report element.

Report designer A1 (110) also includes a report engine JAVA SDK for interacting with report engine 130 to access semantic objects of semantic layer(s) 140. Semantic layer(s) 140 may comprise a set of semantic objects (e.g., dimensions, measures, details), each of which associates one or more physical entities of one or more enterprise data sources with user-friendly names. A user of report designer A1 (110) may lay out BI elements based on the user-friendly names, and report designer A1 (110) automatically generates queries of semantic layer(s) 140 which will return appropriate data from the data source(s) to populate the BI elements. A report specification therefore includes both the layout information (i.e., structure and style of each BI element) and the associated queries.

The data sources (not shown) may include, but are not limited to, relational databases, enterprise applications, legacy applications, Online Analytical Processing (OLAP) sources and other data sources. One of semantic layer(s) 140 may represent data from one or more data sources, and two or more of semantic layer(s) 140 may represent data from a same data source.

Semantic layer(s) 140 may comprise any data source which supports entities and relations therebetween. Types of semantic layers and semantic objects are described in U.S. Pat. No. 5,555,403, and are provided by SAP BusinessObjects products or other Business Intelligence products.

Examples of semantic layer(s) 140 according to some embodiments include SAP BusinessObjects Universes and OLAP data models.

The report engine JAVA SDK allows report designer A1 (110) to store, retrieve and modify business intelligence reports. In this regard, report engine 130 may store reports to and retrieve reports from repository 150. Repository 150 may comprise a Central Management Storage, and may also store serialized BI elements to be shared according to some embodiments.

Report designer A2 (115) may include program code to provide a different user interface and/or functions than those provided by report designer A1 (110). However, report designer A2 (115) also utilizes functions of core SDK A to create reports in file format A based on user commands, and uses shared object SDK A to create, based on a business intelligence report element in file format A, a serialized description of a BI element in a second file format.

Accordingly, in some embodiments, shared object SDK A of report designer A1 (110) may receive a selection of a business intelligence report element in a business intelligence report of file format A from core SDK A of report designer A1 (110), and create a serialized description of the selected business intelligence report element in a second file format based on a business intelligence report element data model. Next, shared object SDK A of report designer A2 (115) may receive an instruction to add the business intelligence report element to a business intelligence report of file format A created by report designer A2 (115), and add the selected business intelligence report element to the business intelligence report in file format A.

Report designer B1 (120) includes program code to provide a user interface for receiving user commands for creating a report in file format B. Similar to core SDK A, core SDK B of report designer B1 (120) provides functions for creating business intelligence reports in file format B. Moreover, core SDK B may use shared object service B (which may or may not be implemented as an SDK) to render a BI element of file format B shareable, and/or to add a shareable BI element to a BI report of file format B according to some embodiments.

In one example, shared object SDK A of report designer A2 (115) receives a selection of a business intelligence report element in a business intelligence report of file format A from core SDK A of report designer A2 (115), and creates a serialized description of the selected business intelligence report element in a second file format based on a business intelligence report element data model. Shared object SDK B of report designer B1 (120) then receives an instruction to add the business intelligence report element to a business intelligence report of file format B created by report designer B1 (120), and adds the selected business intelligence report element to the business intelligence report in file format B.

The report engine SDK of report designer B1 provides interaction with report engine 130 to store, retrieve and modify business intelligence reports. The reports may be stored in or retrieved from repository 150 and/or another repository (not shown).

Report designer C1 (125) may be similar to report designer B1 (120) but, in contrast, report designer C1 (125) processes reports in a file format C. Accordingly, core SDK C of report designer C1 (125) provides functions for creating business intelligence reports in file format C, and core SDK C uses shared object service C (which may or may not be implemented as an SDK) to render a BI element of file format C shareable, and/or to add a shareable BI element in a serialized format to a BI report of file format C according to some embodiments. The shareable BI element may have been originally created in file format A, file format B, or any other format from which a shareable BI element may be generated.

System 100 also includes report engine 170 in communication with repository 150. Report engine 170 may be identical to or differ from report engine 130. Report engine 170 communicates with report designer A3 (155), report designer C2 (160) and report designer D1 (165) via respective suitable report engine SDKs. Report designer A3 (155), report designer C2 (160) and report designer D1 (165) may create BI reports in file formats A, C and D, respectively, which are based on queries of semantic objects of semantic layer(s) 180.

In contrast to report designer A1 (110) and report designer A2 (115), report designer A3 (155) includes shared object service A to create a serialized description of a business intelligence report element and/or to add a business intelligence report element to a business intelligence report of file format A based on such a serialized description. Also, the report engine SDKs of report designer A3 (155), report designer C2 (160) and report designer D1 (165) may be different from the identically-named report engine SDKs of report designer A1 (110), report designer A2 (115), report designer B1 (120) and report designer C1 (125).

Although BI elements of reports generated by report designer A1 (110), report designer A2 (115), report designer B1 (120) and report designer C1 (125) are based on semantic objects of semantic layer(s) 140, embodiments may allow the sharing of such BI elements within reports generated by report designer A3 (155), report designer C2 (160) and report designer D1 (165). Accordingly, some embodiments provide BI element sharing among reporting systems using different file formats and/or between reporting systems in communication with different sets of semantic objects (i.e., semantic layers).

In one example, shared object service C of report designer C2 (160) receives a selection of a BI element in a business intelligence report of file format C from core SDK C of report designer C2 (160), and creates a serialized description of the selected BI element in a second file format based on a business intelligence report element data model. Report designer C2 (160) then uses report engine SDK to store the serialized description of the BI element among shared BI elements of repository 150.

Report designer A2 (115) may browse repository 150 using its report engine JAVA SDK and locate the stored serialized description. Core SDK A of report designer A2 (115) then receives an instruction, which is passed to shared object SDK A, to add the BI element to a business intelligence report of file format A created by report designer A2 (115). Finally, shared object SDK A and core SDK A operate to add the selected BI element to the business intelligence report in file format A.

Figure 2:
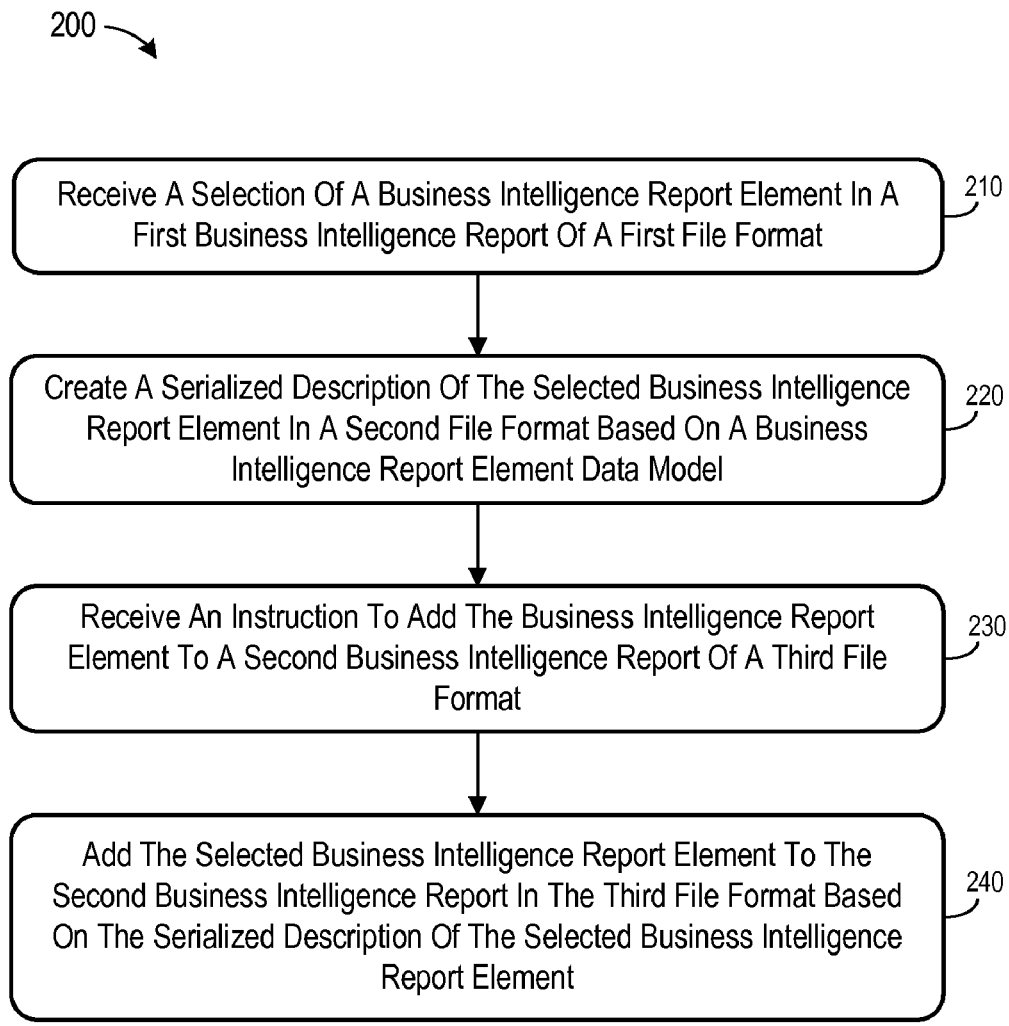
FIG. 2 is a flow diagram of a process according to some embodiments.

FIG. 2 is a flow diagram of process 200 according to some embodiments. Process 200 may be executed by hardware and/or embodied in program code stored on a tangible computer-readable medium.

Figure 3:
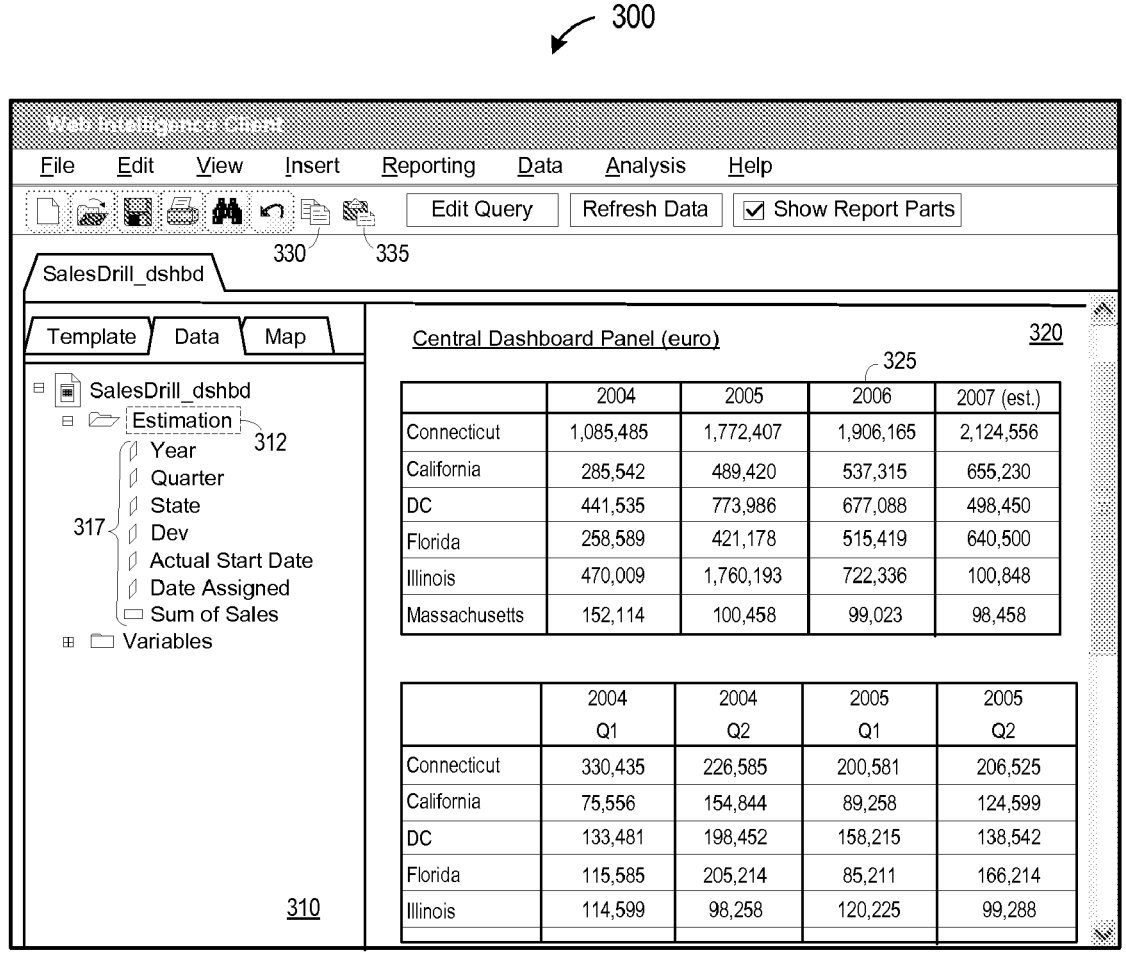
FIG. 3 comprises an outward view of a user interface to select a BI element to share according to some embodiments.

A selection of a BI element is initially received at 210. The BI element is located in a first BI report of a first file format. The selection may be received from a user via a user interface of a report designer used to create the first BI report. FIG. 3 is an outward view of user interface 300 of a report designer according to some embodiments. User interface 300 may be displayed by a client device executing a report designer application, a rich client application in communication with such a report designer application, a browser accessing a Web-based report designer application, or any other suitable system to display a user interface. Any user interface(s) may be used in conjunction with some embodiments.

Panel 310 of interface 300 displays data which may be used to create a report displayed in panel 320. In the illustrated example, panel 310 displays query 312 and its associated semantic objects 317. A dashed rectangle indicates selection of Estimation query 312. Next, Copy icon 330 is selected, resulting in reception of the selection at 210. Any other suitable user interface metaphor may be used to indicate selection of a BI element for sharing according to some embodiments.

The selection may be received by a core SDK and passed to a shared object service (or shared object SDK) as described above. Next, at 220, a serialized description of the selected BI element is created. The serialized description is in a second file format and is based on a BI element data model.

Figure 4:
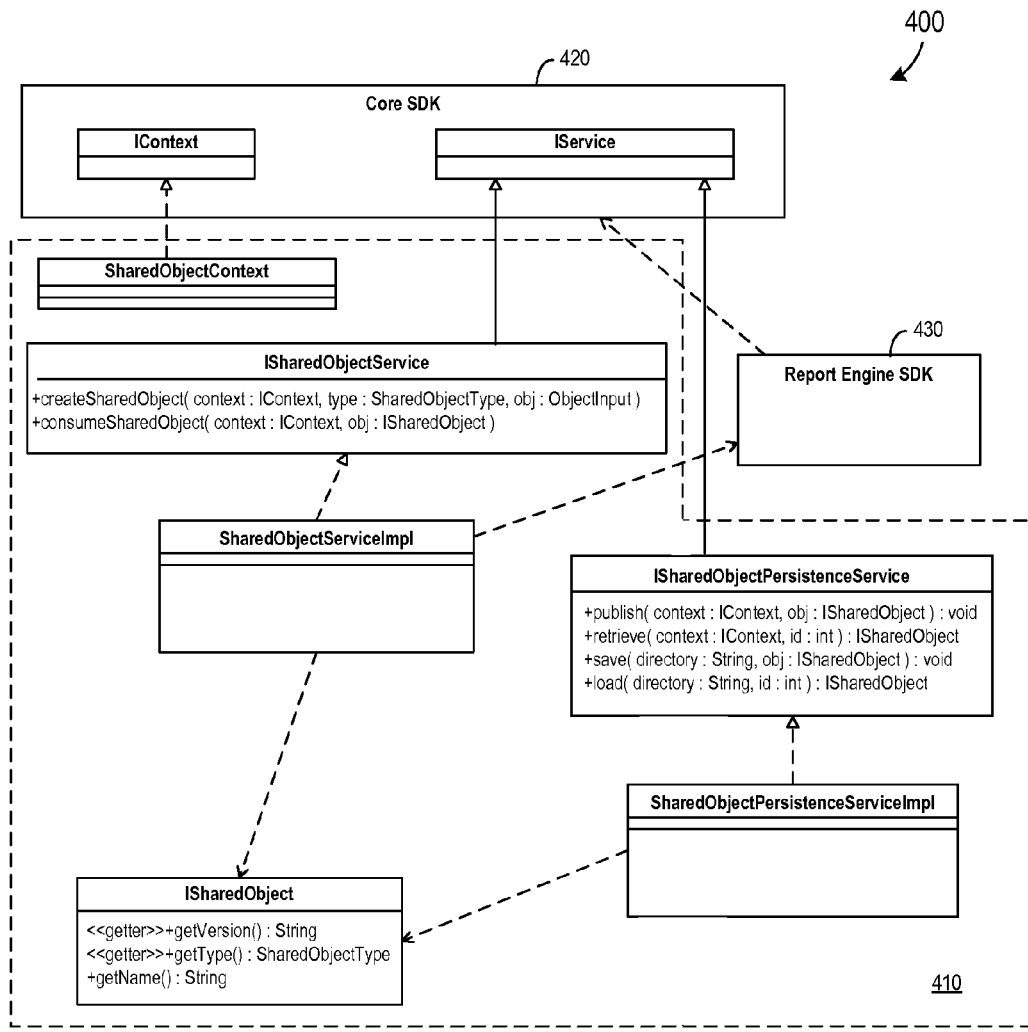
FIG. 4 is a diagram of a software architecture according to some embodiments.
Figure 5:
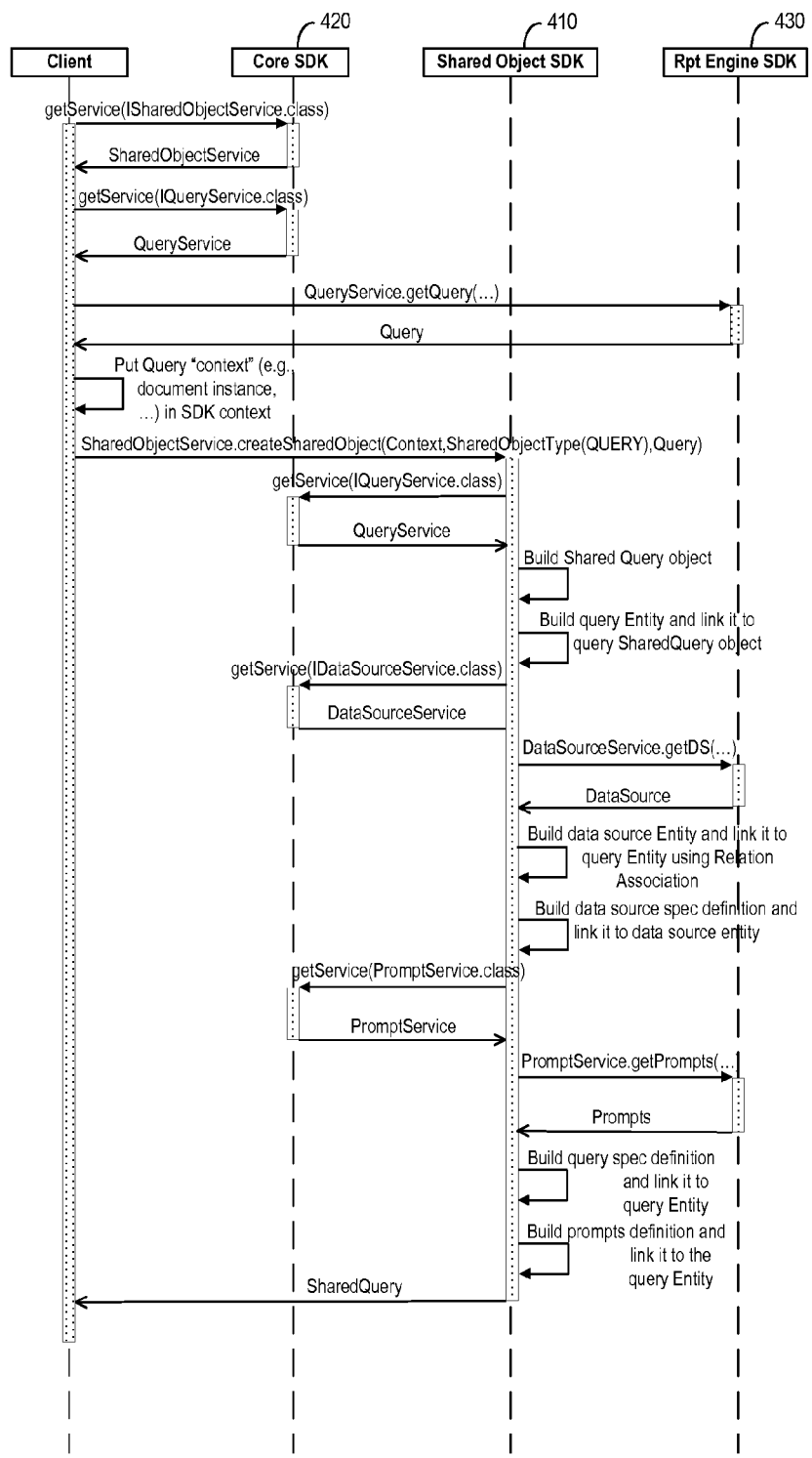
FIG. 5 is a workflow diagram according to some embodiments.

FIG. 4 illustrates software architecture 400 which may be used to create a serialized description according to some embodiments of 220. Software architecture 400 illustrates one system by which components of shared object SDK 410 may interoperate with Core SDK 420 and report engine SDK 430 to provide functions as described herein. FIG. 5 is a workflow setting forth this interoperation with respect to a selected query and according to some embodiments.

As shown in FIG. 5, shared object SDK 410 creates a serialized description by building a shared query object and a query entity linked to the shared query object. Next, shared object SDK 410 builds a data source entity and a data source definition linked to the data source entity. Then, shared object SDK 410 builds a query definition and a prompts definition linked to the query entity.

Figure 6:
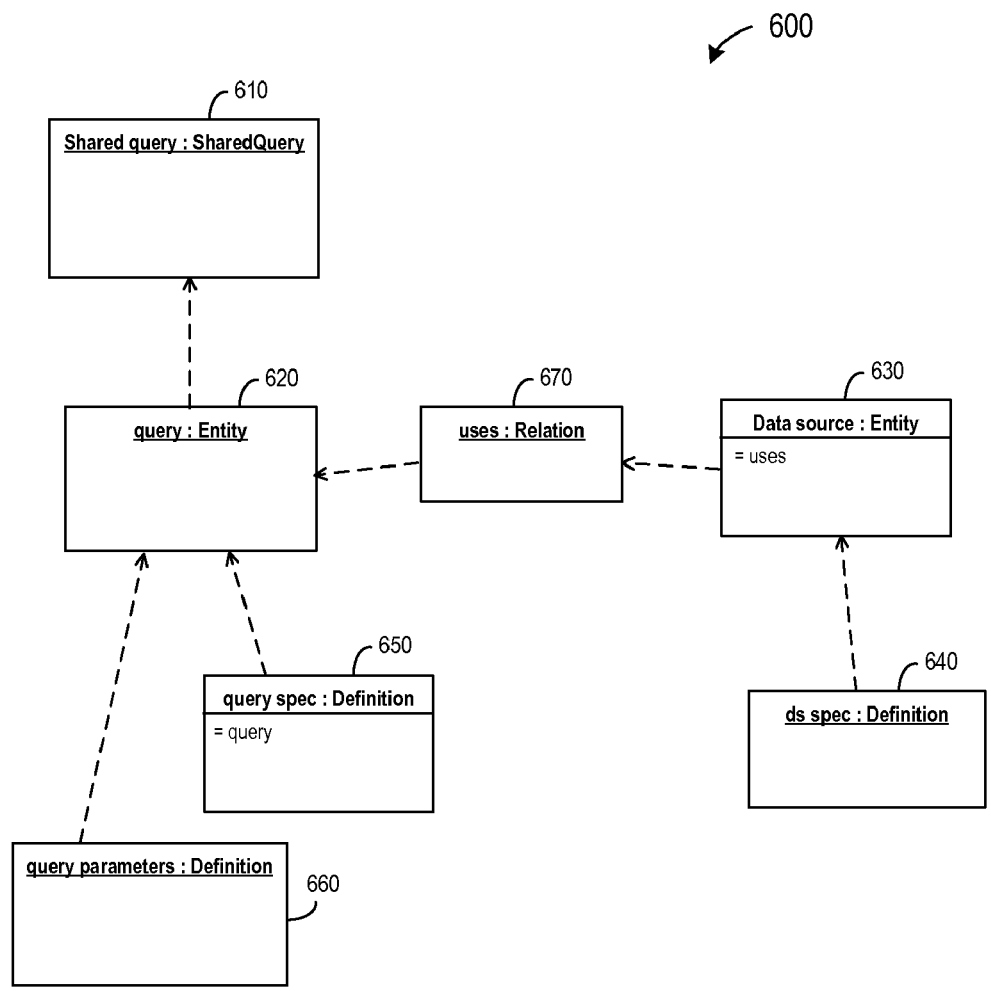
FIG. 6 is a data model of a shared query according to some embodiments.

The objects, entities and definitions are built according to a BI element data model. FIG. 6 illustrates an instantiation of such a model in a case that the BI element is a query. Model 600 includes the aforementioned shared query object 610, query entity 620 linked to shared query object 610, data source entity 630 and data source definition 640 linked to data source entity 630, and query definition 650 and prompts definition 660 linked to query entity 620. Also shown is "uses" relation 670 linking query entity 620 and data source entity 630.

The objects, entities, relations and definitions are then used to create a serialized description. For example, the following XML code is a serialized description of a BI query according to some embodiments.

```
<?xml version="1.0" encoding="UTF-8" ?>
<SharedObject name="Query 1" version="1.0" type="SharedQuery">
  <description>
  - <![CDATA[
    ]]>
    </description>
    <properties />
  <entities>
  <entity eid="1" name="SharedQuery_1" type="Query">
  <contents>
  <content name="QueryStatement" byref="false" version="1.0">
  - <![CDATA[
    ]]>
    </content>
  <content name="QuerySpecification" byref="false" version="1.0">
  - <![CDATA[
    <CombinedQuery ID="-1" CombinedQueryOperator="Union"><Query ID="-1"
        Name="Combined Query -1"><QueryResult
        Key="DS0.DO0"><Name>Team</Name></QueryResult><QueryResult
        Key="DS0.DO1"><Name>Dev Name</Name></QueryResult><QueryResult
        Key="DS0.DO2"><Name>FR Count</Name></QueryResult><QueryResult
        Key="DS0.DO3"><Name>NBIn</Name></QueryResult><QueryResult
        Key="DS0.DO4"><Name>NBOut</Name></QueryResult></Query></Combined
        Query>
    ]]>
    </content>
    </contents>
  <dictionary>
    <metadata type="object" name="Team" objkey="DP0.DO0" dp="DP0"
        ds="DS0" qualif="dimension" />
    <metadata type="object" name="FR Count" objkey="DP0.DO2" dp="DP0"
        ds="DS0" qualif="measure" />
    <metadata type="object" name="Dev Name" objkey="DP0.DO1" dp="DP0"
        ds="DS0" qualif="dimension" />
    <metadata type="object" name="NBOut" objkey="DP0.DO4" dp="DP0"
        ds="DS0" qualif="measure" />
    <metadata type="object" name="NBIn" objkey="DP0.DO3" dp="DP0"
        ds="DS0" qualif="measure" />
    </dictionary>
  <data>
  - <![CDATA[
    "Team","Dev Name","FR Count","NBIn","NBOut"
    "Team1","user1","10","4","6"
    "Team1","user2","9","15","6"
    "Team1","user3","10","5","6"
    "Team2","user4","11","5","8"
    "Team3","user5","12","5","9"
    ]]>
    </data>
    </entity>
  <entity eid="2" name="DS0" type="DataSource">
  <contents>
  <content name="DataSourceSpecification" byref="false" version="1.0">
```

```
- <![CDATA[
<DS DSTYPE="TXT" DSID="DS0"><DSPARAMS><DSPARAM
    NAME="ds.custom.params.charset" VALUE=""/><DSPARAM
    NAME="ds.first_raw_as_object_names" VALUE="true"/><DSPARAM
    NAME="ds.custom.params.file_path"
    VALUE="D:\shared_objects\ds3.txt"/><DSPARAM
    NAME="ds.custom.params.delimiter" VALUE="34"/><DSPARAM
    NAME="ds.custom.params.date_pattern" VALUE="T[Adf]"/><DSPARAM
    NAME="ds.custom.params.locale" VALUE="en_US"/><DSPARAM
    NAME="ds.custom.params.separator" VALUE=";"/></DSPARAMS></DS>
]]>
    </content>
   </contents>
   <dictionary />
  </entity>
 </entities>
 <relations>
   <relation rid="1" src_eid="1" dst_eid="2" />
 </relations>
</SharedObject>
```

Figure 7:
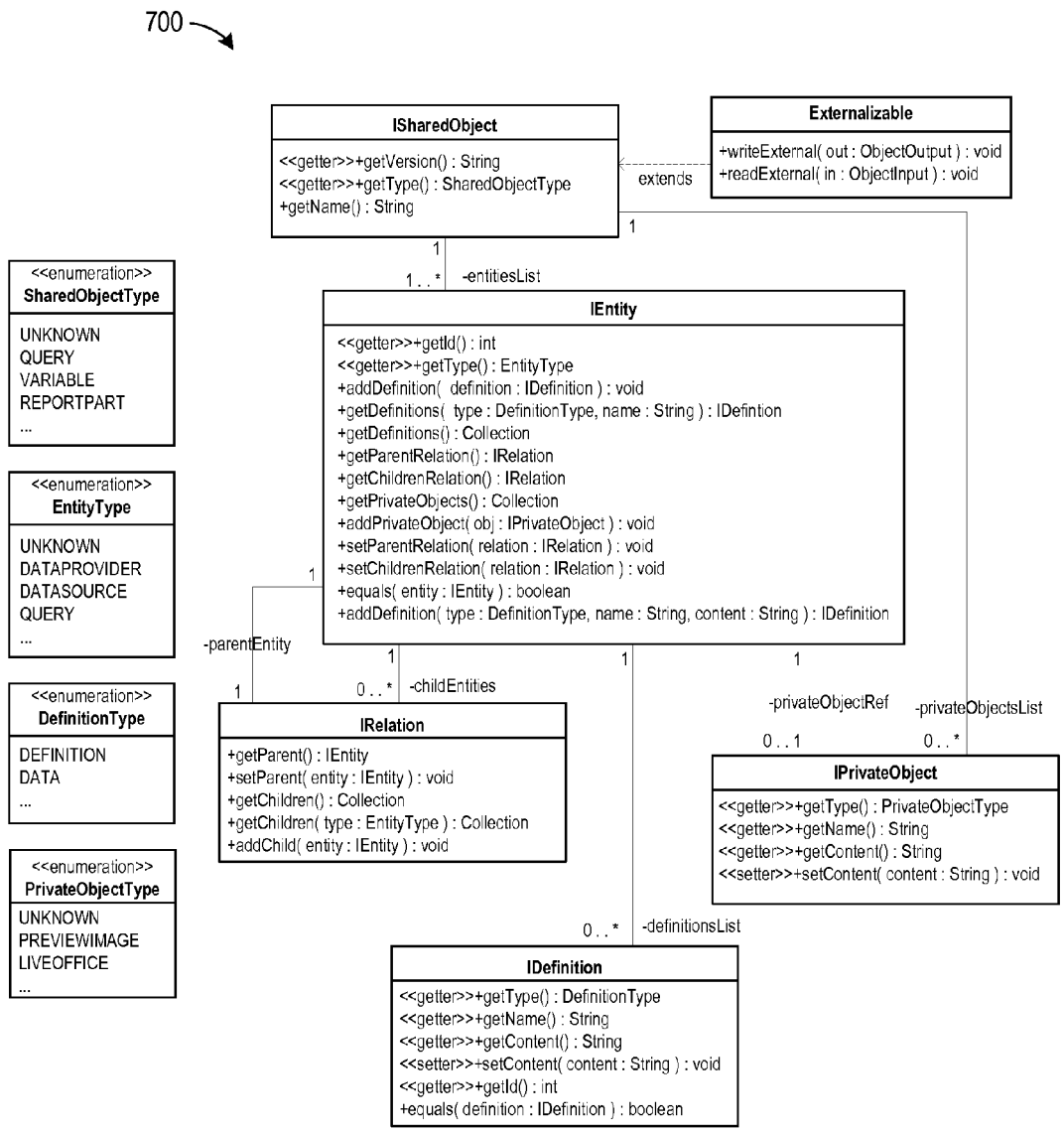
FIG. 7 is a data model of a shared object according to some embodiments.

FIG. 7 illustrates generic BI element data model 700 according to some embodiments. As mentioned above, model 600 may comprise an instantiation of model 700. Other instantiations of model 700 may represent other BI elements (e.g., variable, table, section, report, etc.).

A model representing table BI elements, for instance, may include a shared query table object, a table entity and definitions as shown in FIG. 6. However, because a table includes underlying queries, the shared query table object may also include a query entity, a data source entity and associated definitions as shown in model 600.

For each BI report format supporting shareable BI elements, some embodiments may provide code (e.g., an SDK) to create serialized descriptions of BI elements of the BI report format to serialized descriptions based on model 700. For example, the following XML code is a serialized description of a BI table according to some embodiments.

```
<?xml version="1.0" encoding="UTF-8" ?>
- <sharedobject name="SharedObject" schema_version="1" type="Table"
    version="1.0">
- <dictionary size="19">
    <entry id="0" type="ds_object">DS0.DO0</entry>
    <entry id="1" type="ds_object">DS0.DO1</entry>
    <entry id="2" type="ds_object">DS0.DO2</entry>
    <entry id="3" type="ds_object">DS0.DO3</entry>
    <entry id="4" type="ds_object">DS0.DO4</entry>
    <entry id="5" type="ds_object">DS0.DO5</entry>
    <entry id="6" type="ds_object">DS0.DO6</entry>
    <entry id="7" type="ds_object">DS0.DO7</entry>
    <entry id="8" type="ds_object">DS0.DO8</entry>
    <entry id="9" type="bloc_id">145</entry>
    <entry id="10" type="bloc_id">147</entry>
    <entry id="11" type="bloc_id">148</entry>
    <entry id="12" type="bloc_id">149</entry>
    <entry id="13" type="bloc_id">151</entry>
    <entry id="14" type="bloc_id">152</entry>
    <entry id="15" type="bloc_id">153</entry>
    <entry id="16" type="bloc_id">161</entry>
    <entry id="17" type="bloc_id">168</entry>
    <entry id="18" type="bloc_id">177</entry>
  </dictionary>
  <privateobjects />
- <entities>
- <entity id="2" name="Table" type="Table">
- <definitions>
- <definition id="0" name="Structure" type="definition">
- <TABLE id="SODICTID_9">
- <THEAD class="colheader">
- <TR>
    <TD id="SODICTID_10">=NameOf([Store Name])</TD>
    <TD id="SODICTID_11">=NameOf([Sales revenue])</TD>
    <TD id="SODICTID_12">Revenue light</TD>
  </TR>
  </THEAD>
- <TBODY>
- <TR>
    <TD id="SODICTID_13">=[Store Name]</TD>
    <TD id="SODICTID_14">=[Sales revenue]</TD>
    <TD id="SODICTID_15" />
  </TR>
```

```
      </TBODY>
  <TFOOT class="colfooter">
  <TR>
      <TD id="SODICTID_16">Sum:</TD>
      <TD id="SODICTID_17">=Sum([Sales revenue])</TD>
      <TD id="SODICTID_18">=Average([Sales revenue])</TD>
    </TR>
  </TFOOT>
  </TABLE>
  </definition>
  <definition id="1" name="Calculation" type="definition">/* Table properties
    */ #SODICTID_9 { /* BID 145 */ aliases: "14,SODICTID_3
    15,SODICTID_7 40,SODICTID_19"; column-axis: "f301$a14"; } /* Cell
    Properties */ #SODICTID_10 { /* BID 147 */ cell-content:
    "f301$f291$f456$a14$f457"; cell-type: formula; cell-what: text; }
    #SODICTID_11 { /* BID 148 */ cell-content:
    "f301$f291$f456$a15$f457"; cell-type: formula; cell-what: text; }
    #SODICTID_12 { /* BID 148 */ cell-content: "Revenue light"; cell-type:
    const; cell-what: text; } #SODICTID_13 { /* BID 151 */ cell-content:
    "f301$a14"; cell-type: formula; cell-what: text; } #SODICTID_14 { /*
    BID 152 */ cell-content: "f301$a15"; cell-formatnumber:
    "T[ns]L[$]T[#]T[gs]T[#]T[#]T[0]T[ds]T[0]T[0]T[ne]"; cell-type:
    formula; cell-what: text; } #SODICTID_15 { /* BID 153 */ }
    #SODICTID_16 { /* BID 161 */ cell-content: "Sum:"; cell-type: const;
    cell-what: text; } #SODICTID_17 { /* BID 168 */ cell-content:
    "f301$f270$f456$a15$f457"; cell-formatnumber:
    "T[ns]L[$]T[#]T[gs]T[#]T[#]T[0]T[ds]T[0]T[0]T[ne]"; cell-type:
    formula; cell-what: text; } #SODICTID_18 { /* BID 177 */ cell-content:
    "f301$f265$f456$a15$f457"; cell-formatnumber:
    "T[ns]L[$]T[#]T[gs]T[#]T[#]T[0]T[ds]T[0]T[0]T[ne]"; cell-type:
    formula; cell-what: text; }</definition>
  <definition id="2" name="Style" type="definition">/* Table properties */
    #SODICTID_9 { /* BID 145 */ style: 13; autofit-height: yes; autofit-
    width: yes; name: "Block Result"; x: 4350; y: 1350; multiAlias: true; }
    .colheader { autofit-height: yes; autofit-width: yes; h-everypage: no; v-
    everypage: yes; } .colfooter { autofit-height: yes; autofit-width: yes; h-
    everypage: no; v-everypage: no; } tbody { autofit-height: yes; autofit-
    width: yes; h-everypage: no; v-everypage: no; } /* Cell Properties */
    #SODICTID_10 { /* BID 147 */ style: 7; autofit-height: no; autofit-
    width: no; min-height: 900; min-width: 7275; padding-bottom: 75;
    padding-left: 75; padding-right: 75; padding-top: 75; } #SODICTID_11 {
    /* BID 148 */ style: 7; autofit-height: no; autofit-width: no; min-height:
    900; min-width: 5925; padding-bottom: 75; padding-left: 75; padding-
    right: 75; padding-top: 75; } #SODICTID_12 { /* BID 148 */ style: 12;
    autofit-height: no; autofit-width: no; min-height: 900; min-width: 6412;
    padding-bottom: 75; padding-left: 75; padding-right: 75; padding-top:
    75; } #SODICTID_13 { /* BID 151 */ style: 8; autofit-height: no;
    autofit-width: no; border-bottom-color: #cac9d9; border-bottom-style:
    plain; border-bottom-width: 50; border-left-color: #cac9d9; border-left-
    style: plain; border-left-width: 50; border-right-color: #cac9d9; border-
    right-style: plain; border-right-width: 50; border-top-color: #cac9d9;
    border-top-style: plain; border-top-width: 50; min-height: 900; min-
    width: 7275; padding-bottom: 75; padding-left: 75; padding-right: 75;
    padding-top: 75; } #SODICTID_14 { /* BID 152 */ style: 8; autofit-
    height: no; autofit-width: no; border-bottom-color: #cac9d9; border-
    bottom-style: plain; border-bottom-width: 50; border-left-color:
    #cac9d9; border-left-style: plain; border-left-width: 50; border-right-
    color: #cac9d9; border-right-style: plain; border-right-width: 50;
    border-top-color: #cac9d9; border-top-style: plain; border-top-width:
    50; min-height: 900; min-width: 5925; padding-bottom: 75; padding-
    left: 75; padding-right: 75; padding-top: 75; } #SODICTID_15 { /* BID
    153 */ style: 8; autofit-height: no; autofit-width: no; border-bottom-
    color: #cac9d9; border-bottom-style: plain; border-bottom-width: 50;
    border-left-color: #cac9d9; border-left-style: plain; border-left-width:
    50; border-right-color: #cac9d9; border-right-style: plain; border-right-
    width: 50; border-top-color: #cac9d9; border-top-style: plain; border-
    top-width: 50; min-height: 900; min-width: 6412; padding-bottom: 75;
    padding-left: 75; padding-right: 75; padding-top: 75; } #SODICTID_16 {
    /* BID 161 */ style: 12; autofit-height: no; autofit-width: no; min-
    height: 900; min-width: 7275; padding-bottom: 75; padding-left: 75;
    padding-right: 75; padding-top: 75; } #SODICTID_17 { /* BID 168 */
    style: 12; autofit-height: no; autofit-width: no; min-height: 900; min-
    width: 5925; padding-bottom: 75; padding-left: 75; padding-right: 75;
    padding-top: 75; } #SODICTID_18 { /* BID 177 */ style: 12; autofit-
    height: no; autofit-width: no; min-height: 900; min-width: 6412;
    padding-bottom: 75; padding-left: 75; padding-right: 75; padding-top:
    75; }</definition>
  </definitions>
  <privateobjectreferences />
  </entity>
```

-continued

```
<entity id="1" name="Query 1" type="Query">
  <definitions>
    <definition id="0" name="QuerySpecification" type="definition">
      <CombinedQuery ID="1" CombinedQueryOperator="UNION">
        <Query ID="2" Name="Combined Query 1">
          <QueryResult Key="SODICTID_0">
            <Name>Year</Name>
          </QueryResult>
          <QueryResult Key="SODICTID_1">
            <Name>Quarter</Name>
          </QueryResult>
          <QueryResult Key="SODICTID_2">
            <Name>Week</Name>
          </QueryResult>
          <QueryResult Key="SODICTID_3">
            <Name>Store Name</Name>
          </QueryResult>
          <QueryResult Key="SODICTID_4">
            <Name>City</Name>
          </QueryResult>
          <QueryResult Key="SODICTID_5">
            <Name>State</Name>
          </QueryResult>
          <QueryResult Key="SODICTID_6">
            <Name>Lines</Name>
          </QueryResult>
          <QueryResult Key="SODICTID_7">
            <Name>Sales Revenue</Name>
          </QueryResult>
          <QueryResult Key="SODICTID_8">
            <Name>Quantity Sold</Name>
          </QueryResult>
        </Query>
      </CombinedQuery>
    </definition>
  </definitions>
  <privateobjectreferences />
</entity>
<entity id="0" name="DS0" type="DataSource">
  <definitions>
    <definition id="0" name="Definition"
      type="definition">datasource:Universe:UnivCUID=AZtmGeZqCllIugfputlC
      uho;CMS=MAYA:6400;</definition>
  </definitions>
  <privateobjectreferences />
</entity>
</entities>
<relations>
  <relation source_entity_id="2" target_entity_id="1" type="depends_on" />
  <relation source_entity_id="1" target_entity_id="0" type="depends_on" />
</relations>
</sharedobject>
```

Returning to process 200, an instruction to add the BI element to a second BI report is received at 230. The second BI report reflects a third file format, which may or may not be identical to the first file format. In one example of 230, a user interface such as user interface 300 displays a second BI report in panel 320, a user selects a BI element from a list of shareable BI elements (e.g., stored in repository 150) displayed in panel 310, and the user selects paste icon 335. The file format of the second BI report may be the same as the file format of the first BI report (e.g., if the client application is identical to the client application used in 210), or may be a different file format.

In response, the selected BI report element is added to the second BI report in the third file format at 240. The selected BI report element is added based on the serialized description created at 220.

Figure 8:
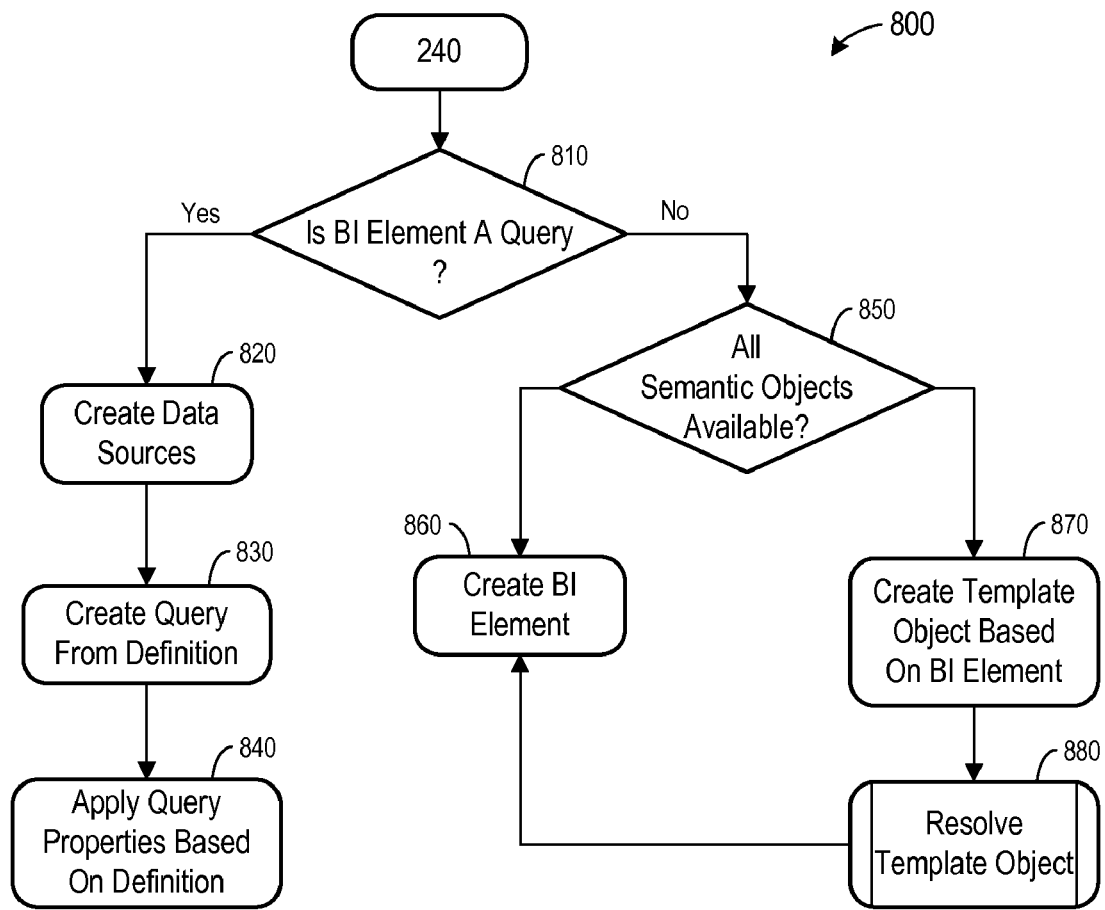
FIG. 8 is a flow diagram of a process according to some embodiments.

FIG. 8 is a flow diagram of process 800 to add a selected BI report element to a second BI report according to some embodiments. Process 800 may be performed by program code of a service such as a shared object service as described herein. Such a shared object service provides functionality to parse the serialized description and to create a BI element in the target file format (i.e., the file format of the second report). Accordingly, different program code may be required for different target file formats.

Initially, at 810, it is determined whether the BI element is a query. If so, associated data sources are created at 820. Model 600 illustrates data source entities and data source definitions associated with a shared query and described by the serialized description. The descriptions of these entities and definitions are parsed at 820 and used to create appropriate data sources in the second report and in the file format of the second report. Similarly, the serialized descriptions of the query entity and query definitions are used at 830 to create a query in the second report and in the file format of the second report. Lastly, at 840, properties are applied to the query based on the query definitions.

Flow proceeds from 810 to 850 if it is determined at 810 that the BI element is not a query. At 850, it is determined whether all semantic objects associated with the BI element are available. If so, the BI element is integrated into the object model of the second report at 860 in the file format of the second report as described in the serialized description.

The integrated BI element may possess all or some of the characteristics of the BI element on which it is based. For example, by default, a shared table BI element added to the object model of a second report per process 800 may reflect the semantic and structural characteristics of the BI element from which it was created, but may adopt the style of the report section to which it is added. Default behavior may differ depending upon the type of BI element to be added, as well as on the context in which it is added.

Flow proceeds from 850 to 870 if one or more semantic objects associated with the BI element are not available. For example, the report designing system which created the second report (e.g., report designer A1 (110)) might be coupled to a semantic layer (e.g., semantic layer 140) which does not include one or more of the semantic objects of a semantic layer (e.g., semantic layer 180) which was used by a first report designing system (e.g., report designer C2 (160)) to create the BI element in a first report.

At 870, a template object is created based on the serialized description of the BI element. The template object lacks one or more semantic and/or calculation features (i.e., semantic objects, variables). Accordingly, the template object is resolved at 880. Resolution of a template object may include instantiation of the missing semantic and/or calculation features in the second report and/or mapping source and target semantic and/or calculation features.

Figure 9:
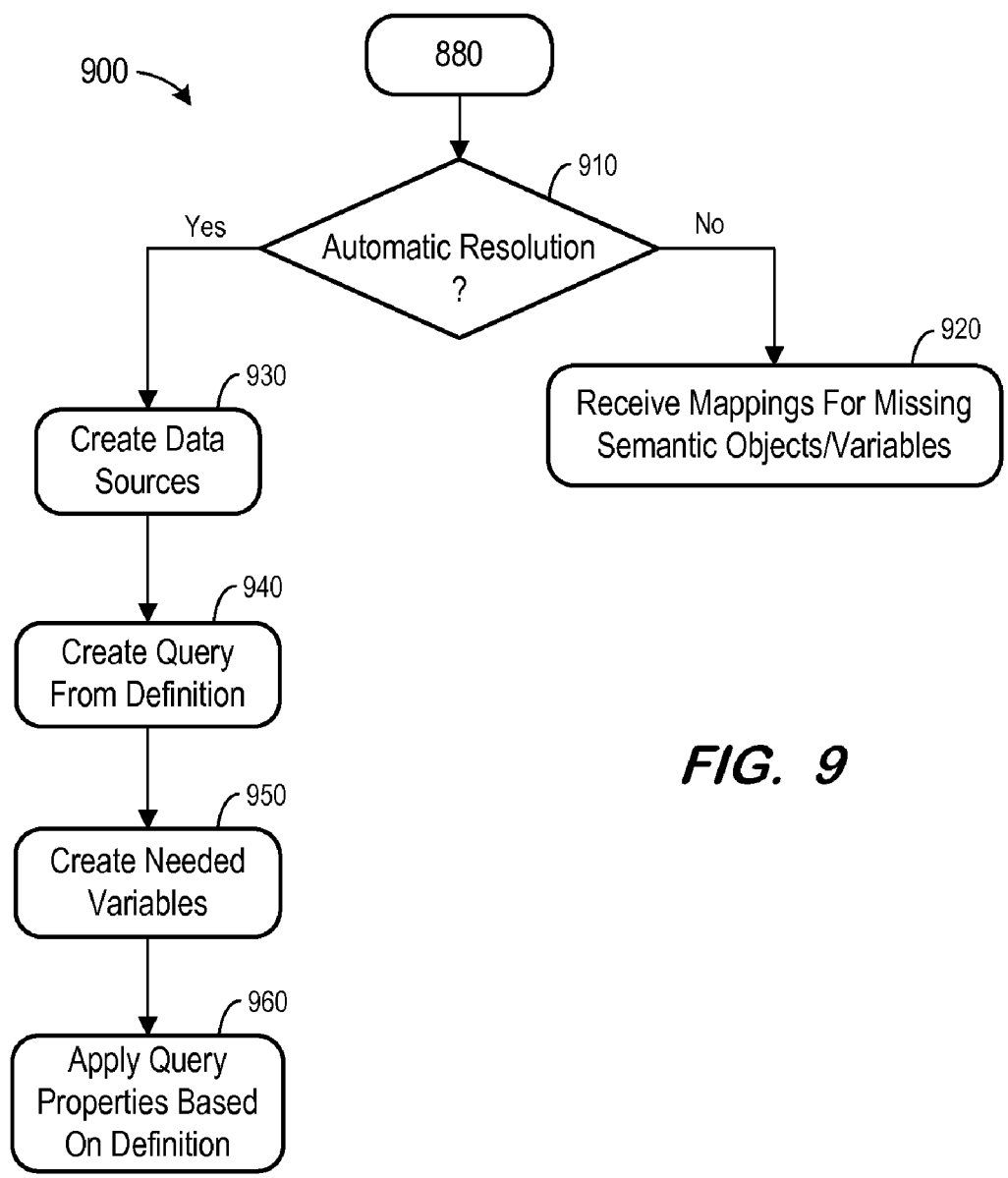
FIG. 9 is a flow diagram of a process according to some embodiments.

FIG. 9 is a flow diagram of process 900 to resolve a template object according to some embodiments. At 910 it is determined whether or not the template object is to be automatically resolved. This determination may be based on a default setting of the system in which the second report is designed, a default setting of the type of BI element to be added to the second report, a selection of the user from whom the instruction to add the BI element was received, etc.

If the template object is not to be automatically resolved, mappings of its missing semantic objects and/or variables are received at 920. Such mappings may be received from a user via any suitable user interface, which may display sortable lists of semantic objects and variables which are available to be mapped within the second report. Flow then continues to 860 to create the BI element in the second report as described above.

If the determination at 910 is affirmative, appropriate data sources and queries are created in the second report at 930 and 940 based on the serialized description as described with respect to 820 and 830. Any missing calculation features (i.e., variables) are also created at 950, and, at 960, properties are applied to the created queries based on the query definitions specified in the serialized description. A BI element based on the resolved template object is then created in the second report at 860 of FIG. 8.

Figure 10:
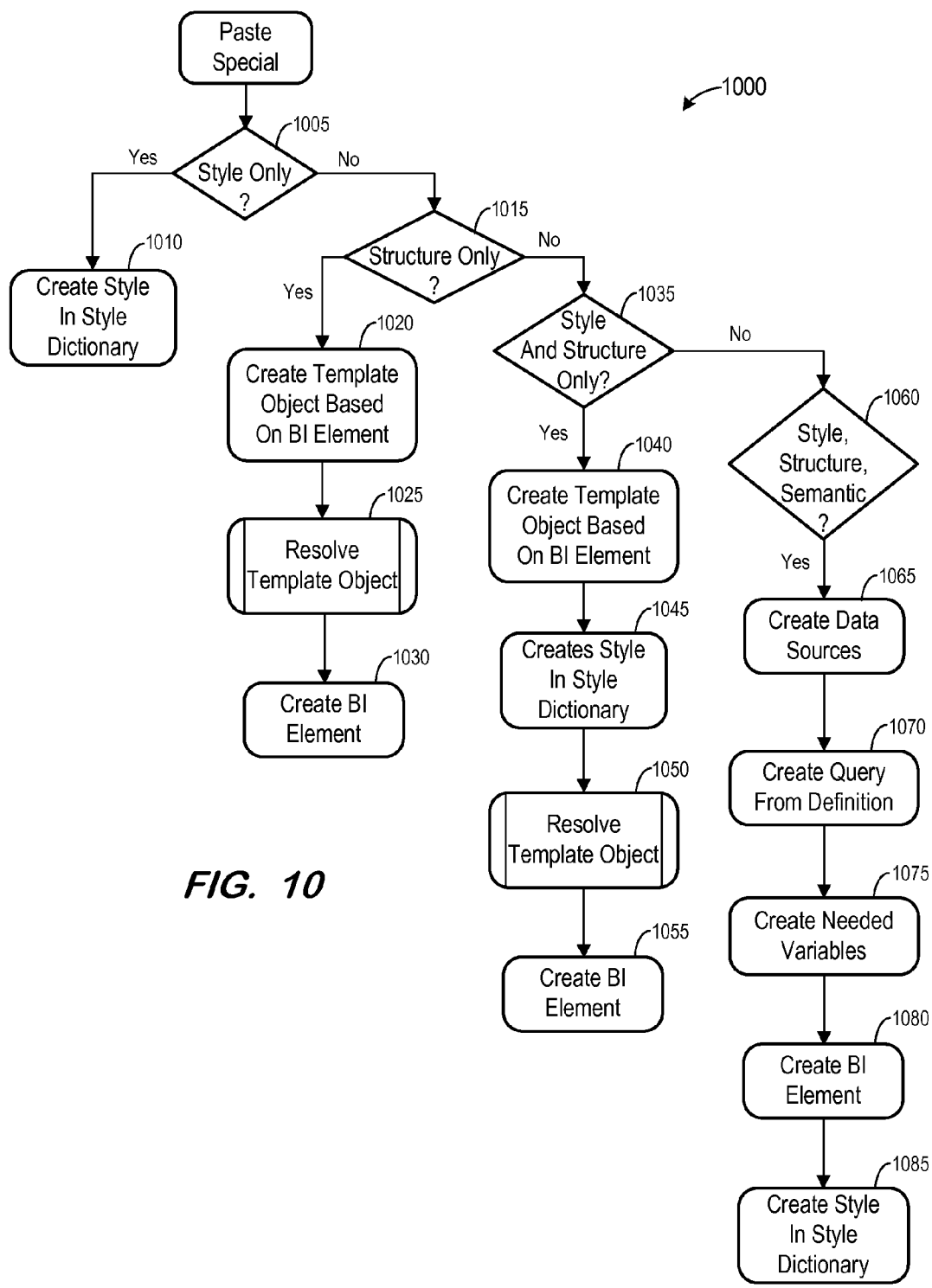
FIG. 10 is a flow diagram of a process according to some embodiments.

Process 1000 of FIG. 10 may be used at 240 of process 200 to provide greater control over the aspects of a shared BI element which are added to a second report. Specifically, flow proceeds from 1005 to 1010 if a user specifies that only the style of a shared BI element is to be added to a second report. As a result, the style (determined from the serialized description of the BI element) is created in the style dictionary of the second report.

Flow proceeds from 1015 to 1020 if a user specifies that only the structure of a shared BI element is to be added to the second report. In this case, a template object is created based on the BI element at 1020 as described with respect to 870, and the template object is resolved at 1025 as described with respect to process 900. A BI element is created in the second report based on the resolved template object at 1030.

If only the style and the structure of the BI element are to be added at 1035, a template object is created based on the BI element at 1040, the style of the BI element is created in the style dictionary of the second report at 1045, and the template object is resolved at 1050. Next, at 1055, a BI element is added to the object model of the second report based on the resolved template object.

Flow reaches 1060 if the determinations at 1005, 1015 and 1035 are negative. At 1060, it is determined that the style, structure and semantic of the shared BI element are to be added to the second report. Flow therefore proceeds through 1065, 1070 and 1075 as described above with respect to 930, 940 and 950. A BI element is added to the object model of the second report at 1080, and the style of the BI element is created in the style dictionary of the second report at 1085. The style dictionary may comprise any data structure employed within the second format to describe styles used in the second report.

According to some embodiments, the serialized description of a shared BI element may include a reference to the original BI element from which it was created. If such a shared BI element is added to a new report, embodiments may monitor the original BI element for changes. If any changes are detected, the corresponding BI element of the new report is changed accordingly. Such a change may be effected by creating an updated serialized description of the changed original BI element, removing the BI element from the new report, and adding a BI element to the new report based on the updated serialized description as described herein.

The embodiments described herein are solely for the purpose of illustration. Those in the art will recognize that other embodiments may be practiced with modifications and alterations limited only by the claims.

What is claimed is:

1. A method comprising:
receiving a selection of a business intelligence report element of a first business intelligence report specification, the first business intelligence report specification in a first file format;
creating a serialized description of the business intelligence report element in a second file format based on a business intelligence report element data model;
receiving an instruction to add the business intelligence report element to a second business intelligence report specification, the second business intelligence report specification in a third file format; and
adding the business intelligence report element to the second business intelligence report specification in the third file format based on the serialized description of the business intelligence report element.

2. A method according to claim 1, wherein the business intelligence report element comprises a query, and wherein adding the business intelligence report element to the second business intelligence report specification in the third file format comprises:
creating data sources in the second business intelligence report specification corresponding to the query;
creating the query in the second business intelligence report specification based on a query definition of the serialized description; and
applying properties to the query based on the query definition.

3. A method according to claim 1, wherein adding the business intelligence report element to the second business intelligence report specification in the third file format comprises:

determining that at least one semantic object of the business intelligence report element is not available in the second business intelligence report specification;
creating a template object based on the business intelligence report element;
creating data sources in the second business intelligence report specification corresponding to one or more queries of the business intelligence report element;
creating the one or more queries in the second business intelligence report specification based on a query definition of the serialized description; and
applying properties to the queries based on the query definition.

4. A method according to claim 1, wherein adding the business intelligence report element to the second business intelligence report specification in the third file format comprises:
determining that at least one semantic object of the business intelligence report element is not available in the second business intelligence report specification;
creating a template object based on the business intelligence report element;
receiving mappings from the at least one semantic object to at least one semantic object of the second business intelligence report specification; and
adding the business intelligence report element to the second business intelligence report specification based on the template object and the mappings.

5. A method according to claim 1, wherein the business intelligence report element comprises a structure, a style and a semantic, and wherein adding the business intelligence report element to the second business intelligence report specification in the third file format comprises:
determining whether to add the style only, the structure only, the style and structure only, or the style, structure and semantic of the business intelligence report element to the second business intelligence report specification;
if it is determined to add the style only, creating the style in a style dictionary of the second business intelligence report specification;
if it is determined to add the structure only, creating a template object based on the business intelligence report element;
if it is determined to add the style and structure only, creating a template object based on the business intelligence report element, and creating the style in a style dictionary of the second business intelligence report specification; and
if it is determined to add the style, structure and semantic, creating data sources in the second business intelligence report specification corresponding to one or more queries of the business intelligence report element, creating the one or more queries in the second business intelligence report specification based on a query definition of the serialized description, creating the business intelligence report element in the second business intelligence report specification, and creating the style in a style dictionary of the second business intelligence report specification.

6. A method according to claim 1, further comprising:
adding to the second business intelligence report specification a reference to the business intelligence report element of the first business intelligence report specification;
detecting an update to the business intelligence report element of the first business intelligence report specification based on the reference; and
updating the business intelligence report element of the second business intelligence report specification based on the update to the business intelligence report element of the first business intelligence report specification.

7. A method according to claim 1, wherein the first file format is different from the second file format.

8. A tangible computer-readable medium having stored thereon program code, the program code executable by a computer to:
receive a selection of a business intelligence report element in a first business intelligence report specification, the first business intelligence report specification in a first file format;
create a serialized description of the business intelligence report element in a second file format based on a business intelligence report element data model;
receive an instruction to add the business intelligence report element to a second business intelligence report specification, the second business intelligence report specification in a third file format; and
add the business intelligence report element to the second business intelligence report specification in the third file format based on the serialized description of the business intelligence report element.

9. The tangible computer-readable medium according to claim 8, wherein the business intelligence report element comprises a query, and wherein the program code executable by a computer to add the business intelligence report element to the second business intelligence report specification in the third file format comprises program code executable by a computer to:
create data sources in the second business intelligence report specification corresponding to the query;
create the query in the second business intelligence report specification based on a query definition of the serialized description; and
apply properties to the query based on the query definition.

10. The tangible computer-readable medium according to claim 8, wherein the program code executable by a computer to add the business intelligence report element to the second business intelligence report specification in the third file format comprises program code executable by a computer to:
determine that at least one semantic object of the business intelligence report element is not available in the second business intelligence report specification;
create a template object based on the business intelligence report element;
create data sources in the second business intelligence report specification corresponding to one or more queries of the business intelligence report element;
create the one or more queries in the second business intelligence report specification based on a query definition of the serialized description; and
apply properties to the queries based on the query definition.

11. The tangible computer-readable medium according to claim 8, wherein the program code executable by a computer to add the business intelligence report element to the second business intelligence report specification in the third file format comprises program code executable by a computer to:
determine that at least one semantic object of the business intelligence report element is not available in the second business intelligence report specification;
create a template object based on the business intelligence report element;

receive mappings from the at least one semantic object to at least one semantic object of the second business intelligence report specification; and add the business intelligence report element to the second business intelligence report specification based on the template object and the mappings.

12. The tangible computer-readable medium according to claim 8, wherein the business intelligence report element comprises a structure, a style and a semantic, and wherein the program code executable by a computer to add the business intelligence report element to the second business intelligence report specification in the third file format comprises program code executable by a computer to:

determine whether to add the style only, the structure only, the style and structure only, or the style, structure and semantic of the business intelligence report element to the second business intelligence report specification;

if it is determined to add the style only, create the style in a style dictionary of the second business intelligence report specification;

if it is determined to add the structure only, create a template object based on the business intelligence report element;

if it is determined to add the style and structure only, create a template object based on the business intelligence report element, and create the style in a style dictionary of the second business intelligence report specification; and if it is determined to add the style, structure and semantic, create data sources in the second business intelligence report specification corresponding to one or more queries of the business intelligence report element, create the one or more queries in the second business intelligence report specification based on a query definition of the serialized description, create the business intelligence report element in the second business intelligence report specification, and create the style in a style dictionary of the second business intelligence report specification.

13. The tangible computer-readable medium according to claim 8, the program code further executable by a computer to:

add to the second business intelligence report specification a reference to the business intelligence report element of the first business intelligence report specification;

detect an update to the business intelligence report element of the first business intelligence report specification based on the reference; and update the business intelligence report element of the second business intelligence report specification based on the update to the business intelligence report element of the first business intelligence report specification.

14. The tangible computer-readable medium according to claim 8, wherein the first file format is different from the second file format.

15. A system comprising:

first hardware of a first report designer to:
create a business intelligence report element in a first business intelligence report specification, the first business intelligence report specification in a first file format;
receive a selection of the business intelligence report element; and
create a serialized description of the business intelligence report element in a second file format based on a business intelligence report element data model;

a repository to store the serialized description; and second hardware of a second report designer to:
create a second business intelligence report specification, the second business intelligence report specification in a third file format;
receive an instruction to add the business intelligence report element to the second business intelligence report specification; and
add the business intelligence report element to the second business intelligence report specification in the third file format based on the serialized description of the business intelligence report element.

16. A system according to claim 15, wherein the business intelligence report element comprises a query, and wherein addition of the business intelligence report element to the second business intelligence report specification in the third file format comprises:

creation of data sources in the second business intelligence report specification corresponding to the query;
creation of the query in the second business intelligence report specification based on a query definition of the serialized description; and
application of properties to the query based on the query definition.

17. A system according to claim 15, wherein addition of the business intelligence report element to the second business intelligence report specification in the third file format comprises:

determination that at least one semantic object of the business intelligence report element is not available in the second business intelligence report specification;
creation of a template object based on the business intelligence report element;
creation of data sources in the second business intelligence report specification corresponding to one or more queries of the business intelligence report element;
creation of the one or more queries in the second business intelligence report specification based on a query definition of the serialized description; and
application of properties to the queries based on the query definition.

18. A system according to claim 15, wherein addition of the business intelligence report element to the second business intelligence report specification in the third file format comprises:

determination that at least one semantic object of the business intelligence report element is not available in the second business intelligence report specification;
creation of a template object based on the business intelligence report element;
reception of mappings from the at least one semantic object to at least one semantic object of the second business intelligence report specification; and
addition of the business intelligence report element to the second business intelligence report specification based on the template object and the mappings.

19. A system according to claim 15, wherein the business intelligence report element comprises a structure, a style and a semantic, and wherein addition of the business intelligence report element to the second business intelligence report specification in the third file format comprises:

determination of whether to add the style only, the structure only, the style and structure only, or the style, structure and semantic of the business intelligence report element to the second business intelligence report specification;
if it is determined to add the style only, creation of the style in a style dictionary of the second business intelligence report specification;

if it is determined to add the structure only, creation of a template object based on the business intelligence report element;

if it is determined to add the style and structure only, creation of a template object based on the business intelligence report element, and create the style in a style dictionary of the second business intelligence report specification; and if it is determined to add the style, structure and semantic, creation of data sources in the second business intelligence report specification corresponding to one or more queries of the business intelligence report element, creation of the one or more queries in the second business intelligence report specification based on a query definition of the serialized description, creation of the business intelligence report element in the second business intelligence report specification, and creation of the style in a style dictionary of the second business intelligence report specification.

20. A system according to claim 15, the second hardware of the second report designer further to:

add to the second business intelligence report specification a reference to the business intelligence report element of the first business intelligence report specification;

detect an update to the business intelligence report element of the first business intelligence report specification based on the reference; and update the business intelligence report element of the second business intelligence report specification based on the update to the business intelligence report element of the first business intelligence report specification.

21. A system according to claim 15, wherein the first file format is different from the second file format.

* * * * *